March 27, 1962 B. A. DI LORENZO ETAL 3,027,465

LOGIC NOR CIRCUIT WITH SPEED-UP CAPACITORS HAVING ADDED SERIES CURRENT LIMITING RESISTOR TO PREVENT FALSE OUTPUTS

Filed April 16, 1958

INVENTORS.
BERNARD A. DI LORENZO
and WALTER R. ANDERSON

BY F. D. Sullivan

ATTORNEY.

3,027,465

LOGIC NOR CIRCUIT WITH SPEED-UP CAPACITORS HAVING ADDED SERIES CURRENT LIMITING RESISTOR TO PREVENT FALSE OUTPUTS

Bernard A. Di Lorenzo, Waltham, and Walter R. Anderson, West Newbury, Mass., assignors, by mesne assignments, to Sylvania Electric Products Inc., Wilmington, Del., a corporation of Delaware Filed Apr. 16, 1958, Ser. No. 728,912
1 Claim. (Cl. 307—88.5)

This invention is concerned with improvements in electronic pulse circuits, and particularly with relatively high speed transistor-resistor logic networks.

In electronic data processing and computer systems, pulse circuits are utilized to perform the AND, OR, and NOT functions of Boolean algebra and thereby process information in a desired manner or perform mathematical calculations. Various types of circuit networks involving diodes, relays, vacuum tubes, etc. have been employed for this purpose; and, with the advent of the transistor, numerous attempts have been made to take advantage of its low power consumption, longer life, greater potential reliability, etc. to provide improved logic circuits. For example, W. D. Rowe has proposed (IRE Wescon Convention Record, 1957, part 4, p. 231) to optimize the possibilities of transistors for this purpose by utilizing their current switching capabilities in a specialized type of logic.

He suggests a basic module of a transistor having a plurality of resistance coupled inputs connected to its base and an output terminal in its collector circuit. A signal through any one of the inputs, e.g. A or B or C, is capable of causing the transistor to conduct in saturation and produce a signal output. Thus, the circuit has the initial characteristic of performing an OR function. Also, since the transistor in effect inverts the signal on its base, the total effect of the logic function is an inverted OR, which Rowe calls a NOR. Combinations of this basic module can be arranged to perform all of the necessary functions of data processing or computer logic.

This type of circuit and logic offer considerable possibilities in reducing complexity and transistor count. Rowe himself, however, indicates (p. 235) that difficulties are experienced in operating at speeds greater than 40 kc. He suggests the use of speed-up capacitors in shunt across the input resistors to overcome the pulse stretching effects of hole storage in the transistors, but indicates that here are resulting complexities and difficulties due to transient effects of the various circuit components. This is especially noticeable when a transistor is operating in an "on" condition with signals on several inputs. If all but one of the inputs suddenly turn off, the resultant discharge through the transistor of the speed-up capacitors cuts the transistor off long enough to introduce a cut off signal into the system when it should be indicating a continuous "on" because one of the inputs had remained in an "on" condition.

The principal object of the present invention is to provide an improved transistor-resistor logic circuit, and especially one more useful at relatively high frequencies. This is accomplished in one embodiment of the invention which features a NOR circuit comprising a transistor with a plurality of inputs connected to its base and an output in its collector circuit. The transistor is normally biased to cut off by current flow through a base biasing resistor; and, a signal of proper amplitude and polarity through any one of the inputs is capable of overcoming the bias and causing the transistor to conduct in saturation, thereby producing an output signal which is an amplified inversion of the input. Each of the input channels comprises a resistor shunted by a capacitor; and, all inputs are connected to a common terminal which, in turn is connected through a current limiting resistor to the base of the transistor. The current limiting resistor, if carefully chosen, has the effect of overcoming the troublesome transient effects of speed-up capacitance referred to above without canceling out its benefits.

Other features and embodiments of the invention will be apparent from the following description and reference to the accompanying drawings, in which.

Figure 1:
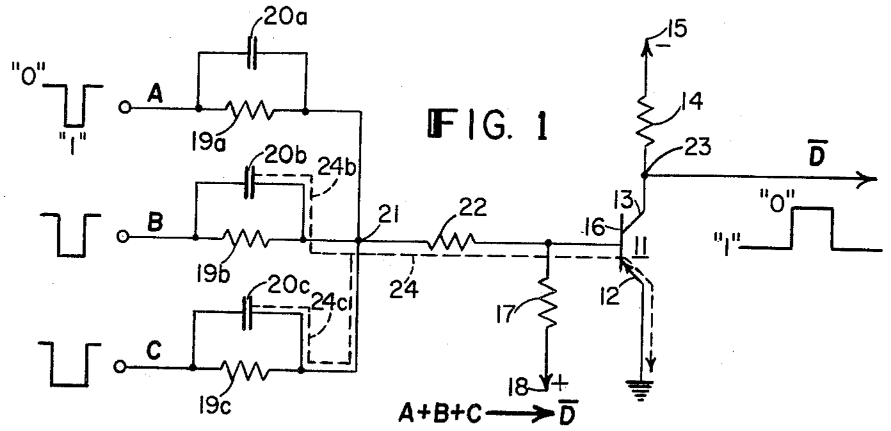
FIG. 1 is a schematic diagram of a NOR circuit embodying the invention.

In the NOR logical circuit of FIG. 1 a pnp transistor 11 has: a common grounded emitter 12; a collector 13 connected through a load resistor 14 to a negative potential reference terminal 15; and, a base 16 connected through a biasing resistor 17 to a positive potential reference terminal 18. Alternative, or simultaneous, input signals to the base 16 may be provided through channels A, B, and C, each of which comprises an input resistor 19 shunted by a capacitor 20. All of the input channels are connected to a common terminal 21 and, thence, through a resistor 22 to the base 16.

The following values of components in the circuit have given satisfactory performance:

| | |
|---|---|
| Transistor **11** | 2N114. |
| Resistor **14** | 750 ohms. |
| Resistor **17** | 12 k. |
| Resistor **22** | 1 k. |
| Resistor **19** | 8.2 k. |
| Capacitance **20** | 82 micro-micro-farads. |
| Potential at **15** | −8 v. |
| Potential at **18** | +1.5 v. |
| Input signal | 0 to −8 v. |

In general, the circuit operates in the following manner to perform the function $A+B+C\rightarrow\overline{D}$, which is to say, there will be no signal output at D if there is a signal input at either A or B or C. Any reasonable number of inputs may be used depending upon such limiting factors as base dissipation capabilities of the transistor, tolerable cross talk etc. For purposes of the present illustration three inputs have been selected as typical.

Since transistor 11 is of the pnp type and is operated in a common emitter mode, a negative potential (−8 v.) is applied to the collector 13, the emitter 12 is grounded, and a positive cut off bias (+8 v.) is applied to the base 16. In the operation of the system as a binary mathematical or logical device, a "1" is represented by an approximately 8 v. negative pulse and a "0" by ground potential.

In the absence of an input signal, the bias current from terminal 18 through resistor 17 and emitter 12 to ground holds the transistor in cut off condition. The result is an application of the full collector potential at output terminal 23. This amounts to the substantially −8 v. of a binary 1 signal.

When, however, a negative signal of proper amplitude, e.g. a −8 v. binary 1, is applied via any one of the input channels A or B or C, the bias current through the base 16 is reversed and the transistor conducts in saturation. Since the voltage drop in the collector-emitter circuit through transistor 11 is now substantially zero, the collector current results in substantially a full 8 v. drop at the terminal 23 across resistor 14, thereby raising the output signal to the substantially ground level of a binary 0.

In this manner a binary one signal (−8 v.) through channel A or B or C to base 16 will result in the transistor conducting and produce the inversion, i.e. a binary 0 at the output terminal 23. Similarly, if there are no one signals at any of the inputs A or B or C, i.e. if they are all zeros, the transistor 11 will be cut off by its bias voltage and a binary one signal (−8 v.) will occur at terminal 23. Thus, $A+B+C\rightarrow\overline{D}$.

The speed-up function of the capacitors 20 and transient voltage limiting functions of the resistor 22 in perfecting the operation of this circuit will be explained in the following more detailed analysis of its operation along with a discussion of the problems overcome by this unique combination of capacitance and resistance in this particular circuit.

Figure 2:
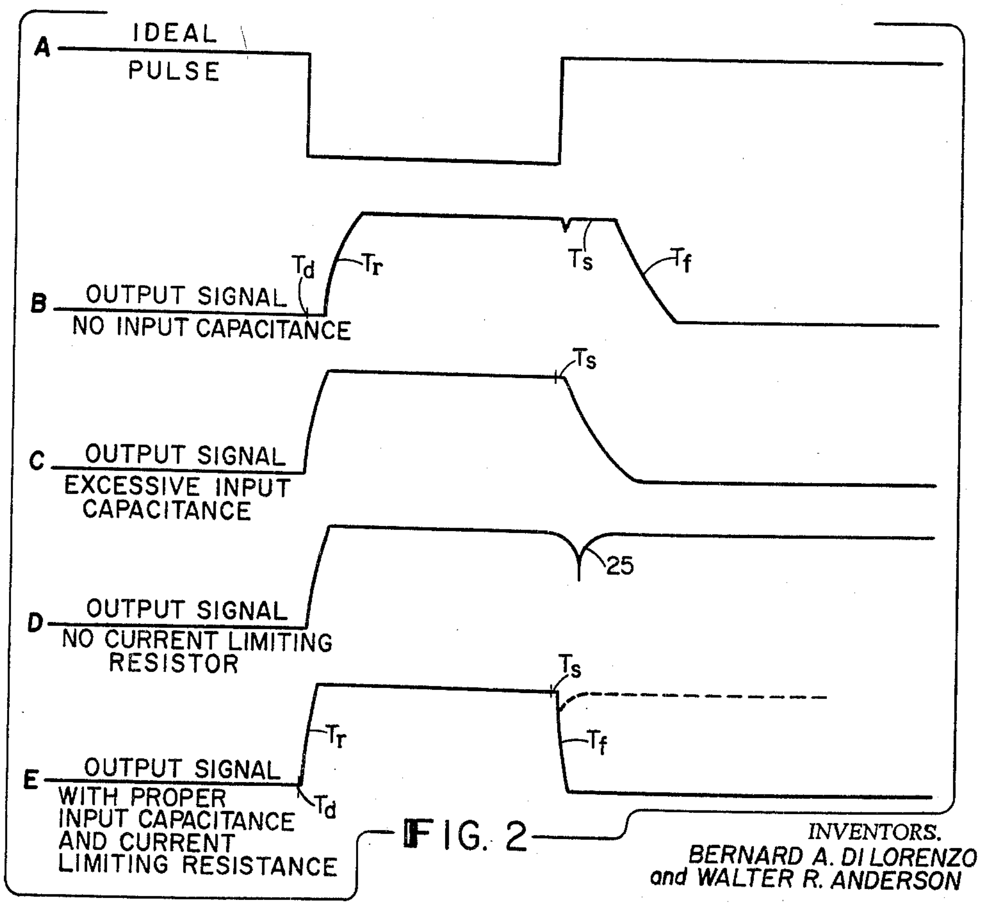
FIG. 2A is a diagrammatic representation of an ideal input pulse on the base of the transistor in the circuit of FIG. 1.
FIG. 2B represents an output pulse from the same transistor without benefit of a speed-up capacitor in the input circuit.
FIG. 2C represents the output pulse with excessive speed-up capacitance in its input circuit.
FIG. 2D represents an output pulse having suitable capacitance in its input, but without the current limiting resistance of the invention.
FIG. 2E represents the output pulse having both suitable input capacitance and the current limiting input resistance of the invention.

FIG. 2A shows an ideal input pulse applied to the base 16 of transistor 11. Such a pulse may be derived from any suitable pulse generator (not shown). For the purposes of this illustration, a 5 microsecond pulse having an amplitude of −8 v., referenced to ground, is assumed. In the circuit as originally proposed by Rowe, i.e. without the capacitance 20 and the current limiting resistor 22, this pulse may be assumed to arrive through input resistor 19 substantially undistorted at the base 16. The function of resistor 19 is to limit the base current and power dissipation in the transistor and to isolate previous stages (not shown) from the bias voltage and the other inputs.

The effect upon pulse 2A of passing through a transistor in a typical NOR circuit is shown at 2B. After an initial delay, $t_d$, of approximately .3 microsecond, the transistor starts to conduct and, due to the RC effect of the overall impedance of the transistor itself and its associated input and output circuitry, follows a rise time curve, $t_r$, of approximately .5 microsecond. After the input pulse has cut off, the hole storage of the transistor causes it to continue to conduct for a period, $t_s$, of approximately 1.1 microseconds. Then a fall time, $t_f$, of approximately 1 microsecond occurs. The result in a single stage of logic function and amplification is a pulse shifting distortion and stretching of approximately 50 percent for the 5 microsecond input pulse. This effect is many times multiplied in a cascade effect when the pulse is processed through a number of stages, to the extent that circuit operation becomes unreliable, as indicated by Rowe, especially in operations at a speed greater than 40 kc.

Rowe has suggested the use of a speed-up capacitor in shunt with the input resistor 19 to sweep the holes from the base region of the transistor and thereby speed up the operation of the circuit by cutting down on the storage delay, $t_s$. This has the effect in a typical circuit, as shown in FIG. 2C, of cutting the initial transistor delay, $t_d$, down to .08 microsecond, reducing the rise time, $t_r$, to .22 microsecond, reducing the delay due to hole storage, $t_s$, to .08 microsecond and the fall time to .36 microsecond. These results are desirable and helpful, but as Rowe pointed out, the overall transient effect resulting from introducing the shunt input capacitance into the circuit presents difficulties.

One of these difficulties is that the introduction of input capacitance results in a decrease in fall time, $t_f$, up to a certain value of capacitance. Beyond this point, however, the necessity of charging the input capacitance of a following stage results in a gradual increase in fall time and cancels out this particular benefit of the input capacitor 20.

Another, and very serious transient effect, results when, for example, the circuit has input signals applied simultaneously to all three channels A, B, and C causing the transistor 11 to conduct; and, then, inputs B and C are suddenly and simultaneously cut off while input A remains in the "on" condition which is supposed to result in maintaining transistor 11 in saturated conduction. In the absence of resistor 22, capacitors **20*b* and 20*c* discharge along path 24 through transistor 11 in opposition to the base input current of channel A, and in the direction of the base bias which produces transistor cut off. The result is a momentary transistor cut-off which produces a voltage spike, shown at 25** in FIG. 2D. The effect of this spike is to introduce into the system a negative going signal of the order of −4 v. which, especially when cascaded and amplified, will have the effect of cutting off transistors which should be on and thereby introducing errors into the data processing and arithmetic computations.

In order to overcome the effect of the voltage spike 25 and improve the reliability of the circuit, the inventors have introduced the current limiting resistor 22 between the common input terminal 21 and the base 16 of transistor 11. This provides a voltage drop in the capacitor discharge path 24 to the transistor 11 so that the effect of condensers **20*b* and 20*c* discharging through the transistor will be minimized and the spikes 25 will be eliminated. It might be expected that the introduction of this current limiting resistor 22 into the input circuit in series with the speed-up capacitors 20 would result in an RC delay which overcomes the speed-up effects of these capacitors and reverts the operating speed of the circuit to approximately the original 40 kc. The present inventors, however, have discovered that by proper correlation of values of resistor 22 and capacitors 20 they can retain the speed-up effects of the capacitance in improving the rise and fall times of the transistor and sweeping the holes from the base region to cut down substantially on the storage time, and also overcome the introduction of excessive fall time and cut-off spikes 25** into the circuit.

FIG. 2E shows how the combination circuit parameters previously suggested results in a satisfactory pulse with an initial delay, $t_d$, of approximately .08 microsecond, a rise time, $t_r$, of only approximately 0.22 microsecond, a storage, $t_s$, of only approximately .08 microsecond, and a fall time, $t_f$, of only approximately .36 microsecond.

The improved transistor-resistor logic circuit shown and described, with the circuit elements and values suggested, has given satisfactory performance in logic networks performing NOR functions at speeds of approximately 400 kc. The invention, however, is not limited to the illustrated modification and embodiment, or these specific parameters, but is to be given the scope of the following claim.

What is claimed is:

An inverted OR circuit comprising: a transistor having collector, base and emitter electrodes; a plurality of input connections to said base electrode, each of said connections including an input terminal and an input resistor shunted by a speed-up capacitor; means for causing said transistor to conduct in saturated condition when a suitable signal is applied to any one of said input terminals; and, a common discharge path for said speed-up capacitors through said transistor to a source of reference potential, said path consisting solely of the base-emitter circuit of said transistor and a common attenuating resistor connected in series between said base electrode and all of said capacitors, said resistor being of a value less than the resistance of said input resistors but sufficient to attenuate signals discharged from said capacitors through said base-emitter circuit without causing said transistor to cut off when said suitable signal continues at only one of said input terminals even though others of said capacitors associated with others of said terminals are discharging through said transistor.

References Cited in the file of this patent

FOREIGN PATENTS 787,333 Great Britain ----------- Dec. 4, 1957

OTHER REFERENCES

Handbook of Semiconductor Electronics, by Hunter, first edition, 1956, McGraw-Hill Book Co., Inc., chap. 15, page 48.

Rowe: "Transistor Nor Circuit Design" AIEE Paper No. 57–196, Feb. 6, 1957.